United States Patent [19]

Cerda et al.

[11] Patent Number: 5,514,666

[45] Date of Patent: May 7, 1996

[54] PREPARATION AND USE OF A PROTEIN-ENRICHED PECTIN COMPOSITION

[75] Inventors: James J. Cerda, Gainesville; Charles W. Burgin, Hawthorne, both of Fla.

[73] Assignee: University of Florida, Gainesville, Fla.

[21] Appl. No.: 279,770

[22] Filed: Jul. 25, 1994

Related U.S. Application Data

[63] Continuation of Ser. No. 817,151, Jan. 6, 1992, abandoned.

[51] Int. Cl.$^6$ .................. A61K 31/715; C08B 37/06; C07H 1/08; A23L 2/00
[52] U.S. Cl. ................... 514/54; 536/2; 536/124; 536/128; 426/590; 426/599; 426/656; 426/658; 426/804
[58] Field of Search .................... 514/54; 536/2, 536/124, 128; 426/590, 599, 656, 658, 804

[56] References Cited

U.S. PATENT DOCUMENTS

| | | | |
|---|---|---|---|
| 3,917,852 | 11/1975 | Maraulja et al. | 426/599 |
| 4,056,566 | 11/1977 | Sakakibara et al. | 426/580 |
| 4,195,127 | 3/1980 | Hartdegen et al. | 435/174 |
| 4,212,893 | 7/1980 | Takahata | 426/590 |
| 4,338,340 | 7/1982 | Morimoto et al. | 426/104 |
| 4,391,830 | 7/1983 | Gudnason et al. | 426/583 |
| 4,430,349 | 2/1984 | Malone et al. | 426/804 |
| 4,497,838 | 2/1985 | Bonnell | 426/481 |
| 4,835,262 | 5/1989 | Sakai | 536/2 |

FOREIGN PATENT DOCUMENTS

| | | |
|---|---|---|
| 1130883 | 2/1983 | Australia . |
| 6983587 | 3/1987 | Australia . |

OTHER PUBLICATIONS

P. A. Baekey, et al; Grapefruit Pectin Inhibits Hypercholesterolemia . . . ; Clin. Cardiol. vol. 11, pp. 595–600, Sep. 1988.

J. J. Cerda, M.d., et al.; The Effects of Grapefruit Pectin on Patients . . . ; Clin. Cardiol. 11, 589–594, 1988.

*Primary Examiner*—Douglas W. Robinson
*Assistant Examiner*—Everett White
*Attorney, Agent, or Firm*—Saliwanchik & Saliwanchik

[57] ABSTRACT

Methods for preparing a protein-enriched pectin composition in granular form, and the use of the product in edible foodstuffs and beverages.

14 Claims, No Drawings

PREPARATION AND USE OF A PROTEIN-ENRICHED PECTIN COMPOSITION

This application is a continuation of application Ser. No. 07/817,151, filed Jan. 6, 1992, now abandoned

BACKGROUND OF THE INVENTION

1. Field of the Invention

This invention relates to methods for preparing a protein-enriched pectin composition and the use of this material in making a dietary supplement rich in protein concentration.

2. Related Art

Pectins are a group of high-molecular-weight heterogeneous polysaccharides which serve as fundamental structural components of plant cell walls in fruits and vegetables, particularly limes, lemons, grapefruit, and oranges. Pectin is composed of D-anhydrogalacturonic acid units linked through $\alpha(1\rightarrow 4)$-glycosidic bonds forming a polygalacturonic acid with some of the carboxyl groups esterified with methanol. Since pectin is not susceptible to hydrolysis by the alimentary tract enzymes of humans, it is classified as a dietary fiber.

Pectin products are normally manufactured by aqueous extraction of appropriate edible plant material such as those enumerated above. Food grade pectin consists of partially methylated polygalacturonic acid units and is normally classified according to its degree of esterification or methoxy content.

In high ester- or high methoxyl (HM)-pectin, a relatively high portion of the carboxyl groups occur as methyl ester and the remaining carboxylic acid groups are in the form of the free acid or as its ammonium, potassium, calcium, or sodium salt; its useful properties may vary with the degree of esterification and with the degree of polymerization. Pectin in which less than 50% of the available carboxyl acid groups occur as the methyl ester is normally referred to as low methoxyl (LM)-pectin. In general, LM pectin is obtained from HM pectin by a treatment such as mild acid or alkaline conditions. Amidated pectin is obtained from HM pectin when ammonia is used in the alkaline deesterification process. In this type of pectin, some of the remaining carboxylic acid groups have been transformed into the acid amide. The useful properties of amidated pectin may vary with the properties of methoxyl and amide substitutions and with the degree of polymerization. Commercial pectin is normally blended with sugars for standardization purposes, and some types may contain suitable food-grade buffer salts required for pH control and desirable setting characteristics.

Since it is a constituent of all plants, pectin has long been part of the human diet. Pectin has been evaluated and cleared toxicologically by the Joint FAO/WHO Expert Committee on Food Additives. Consequently, it was deemed unnecessary to establish an acceptable daily intake. National and international food regulations recognize that pectin is a valuable food gelling agent and harmless food additive. Pectin is included in the list of permitted additives in standardized foods when a technological need can be proven.

U.S. Pat. No. 4,497,838 describes the preparation of various orange products from orange peels. The preparation involves extraction of orange peels with a non-aqueous water-miscible solvent. The solvent-extracted peel is dried to produce a product high in cellulose and pectin. The dried peel product is then ground by suitable means such as a hammer mill to a size appropriate for its intended use.

Pectin has been shown to be an effective hypocholesterolemic agent with minimal side effects (Reiser, *Food Technol.*, 41–91, 1987). It has also been found that grapefruit pectin inhibits hypocholesterolemia and atherosclerosis in miniature swine (Baekey, et al., *Clin. Cardiology*, 11:595–600, 1988). Furthermore, grapefruit pectin has proven to lower plasma cholesterol levels in human volunteers who were hypercholesterolemic, and to improve the ratio of low density lipoprotein cholesterol (LDLC) to high density lipoprotein cholesterol (HDLC) (Cerda, *Clin. Cardiology*, 11:589–594, 1988).

Based on epidemiological and experimental studies, it is clear that the causative factor for coronary heart disease is associated with high plasma lipid and lipoprotein levels. Further, evidence is abundant that lowering lipid levels by diet and/or drugs reduces the risk of coronary heart disease.

In view of the above, pectin-rich food compositions would be useful adjuvants in a fat-restricted diet of a hypercholesterolemic patient, or in a diet aimed at the primary prevention of atherosclerosis in healthy individuals. Thus, simple methods which allow the manufacture of pectin-enriched food compositions are needed to provide the general public with dietary forms of pectin. The present invention provides a preparation method which achieves this goal.

SUMMARY OF THE INVENTION

It has now been found that a simple operation can be employed to provide a pectin product rich in protein concentration which can be included in edible foodstuffs or can be readily homogenized with a drinkable fluid such as a beverage.

The method for preparing a protein-enriched pectin product comprises (a) contacting pectin with a water-soluble, edible protein in aqueous solution to solubilize pectin; (b) adding one or more of the solvents selected from the group consisting of methanol, ethanol, and acetone; (c) allowing curd to form in the solution of step (b); and (d) filtering the curd to provide the final pectin product, and drying, if desired. Preferably, the method includes the step of acidifying the solution of step (a) with a food approved acid prior to step (b).

Preferred in the method is the use of citrus (e.g., grapefruit) pectin, particularly HM pectin, as the pectin source, and the use of ethanol as the added solvent. Preferred source of the protein is egg white or skimmed milk.

Also part of the present invention is an edible foodstuff or beverage containing a protein-enriched pectin composition prepared by the aforementioned method. Edible foodstuffs and beverages especially contemplated include desserts, salad dressings, gelatin desserts, puddings, carbonated beverages, juices, and dry beverage mixes.

A further aspect of the present invention is a dietary supplement comprising a protein-enriched pectin composition prepared according to the aforementioned method.

DETAILED DESCRIPTION OF THE PREFERRED EMBODIMENT

The present method for preparing a protein-enriched pectin composition includes the step of contacting pectin with a water-soluble, edible protein in an aqueous solution, preferably in water.

A suitable protein used in this invention can be any form of a water-soluble, edible protein as long as it has not been denatured. Preferred protein sources are egg white and skimmed milk. Egg white may be fresh, frozen, or dried. Skimmed milk may be fresh or dried.

The pectin used as the starting material for the method is preferably citrus (e.g., grapefruit) HM pectin prepared by acid extraction of fruit peel.

The contact time necessary to solubilize the pectin is not crucial, but generally is in the range of a few minutes to about one hour. In preparing the pectin solution, it is preferred that pectin consists of about 0.5 to about 5% (w/w) of the solution.

The amount of the protein will depend on the degree of desired protein content in the final product. In general, the ratio of pectin to protein varies from about 2:1 to about 1:100 and is sufficient to make the pectin soluble in the solution in the contact time previously indicated.

The present method preferably includes the step of acidifying the pectin-containing solution with a food approved acid. The acids useful in those methods must be compatible with a foodstuff should trace amounts be left in the final product. Preferably, dilute acetic acid, such as vinegar, is used. Other acids which meet this requirement are a food approved carboxylic acid such as citric acid, tartaric acid, fumaric acid, etc. By adding acid to the solution of pectin, the present method allows for the pH to be adjusted to between about 3.0 and about 5.0. Acidification of the pectin solution may be necessary for the protection of pectin's ester groups.

The present process requires an organic solvent in order to denature the protein and to precipitate pectin simultaneously. Those organic solvents which can be added may consist of one or more of methanol, ethanol, or acetone. The preferred solvent is ethanol.

On standing for a sufficient period of time, followed by the addition of the above-named solvents, a thorough mixing provides curd. The curd formation is substantially complete in about 1–2 hours. The product is then recovered by filtration, preferably through a cloth filter. This product may be washed with the same solvents as those employed above.

Following the completion of the procedure, the product is filtered again if the washing has consisted of suspending the once-filtered product in the solvent. The washed product can be dried, if desired. When drying is so desired, it can be carried out at slightly elevated temperatures usually at reduced pressure.

The present method allows for the isolation of the protein-enriched pectin composition in granular form. In certain instances, further milling of the product is desirable.

The protein-enriched pectin product prepared by the present method employing egg white or skimmed milk comprises from about 30 to about 35 (w/w) % of pectin, more preferably from about 31 to about 33 (w/w) % of pectin, the balance being lactalbumin, casein or ovalbumin.

As previously indicated, the protein-enriched pectin composition prepared by the described method can be included in various foodstuffs and used as a dietary supplement. Typical products in which the pectin composition finds use include jams, marmalades, jellies, preserves, and fruit butters; in frozen food compositions such as ice cream, sherbet; in baked goods such as cakes, cookies, pastries, and other foodstuff containing wheat and other flour; in beverages such as juice; in toppings, sauces, and puddings, and in salad dressings.

The protein-enriched pectin composition of the present invention is not only nutritious, because of high protein concentration, but also is useful as a dietary supplement which would be effective in lowering plasma cholesterol. Wide application of the pectin product in foods is also possible without impairing the physical properties and the taste of the foods.

The present invention is illustrated by the following examples. However, it should be understood that the invention is not limited to the specific details of these examples.

EXAMPLE 1

A 2000 ml flask equipped with a stirrer was charged with 100 g of egg white, 250 ml of water, and 5 g HM grapefruit pectin (available from Hercules, Inc., Wilmington, Del.). The mixture was stirred at room temperature until pectin is substantially solubilized. To the mixture, 10 ml of vinegar was added upon mixing, to adjust the pH of the mixture to between about 3.0 to 5.0. The mixture was allowed to stand for about 30 minutes. To the mixture, 1200 ml of 95% ethanol was added and the mixture was allowed to stand for about 1–2 hours until curd formation was complete. The curd was filtered off through filter cloth, washed with 500 ml of 75% ethanol, and dried at 65° C. for about 20 hours to produce a granular powder. The yield was 15.0 g±2 g. The protein was assayed by the method of Lowry [Lowry OH, et al., *J. Biol. Chem.* 193:265–275, 1951].

EXAMPLE 2

A 2000 ml flask equipped with a stirrer was charged with 250 ml of skimmed milk and 5 g HM grapefruit pectin (available from Hercules, Inc., Wilmington, Del.). The mixture was stirred at room temperature until pectin is substantially solubilized. To the mixture, 10 ml of vinegar was added upon mixing, making the pH of the mixture to between about 3.0 and 5.0. The mixture was allowed to stand 30 minutes. To the mixture was added 1200 ml of 95% ethanol. After mixing, the mixture was allowed to stand until curd formation was complete (1–2 hours). The curd was filtered off through filter cloth, washed with 500ml of 70% ethanol, and dried at 65° C. for about 20 hours to afford a granular powder. The yield was 16.0 g±3 g. The protein was assayed by the method of Lowry.

The following characteristics of the pectin product prepared according to the procedure of EXAMPLE 1 or EXAMPLE 2 were observed:

| CHARACTERISTIC | DESCRIPTION |
| --- | --- |
| Color | Creamy-yellow |
| Form | Large granules |
| Taste | Very slight |
| Smell | Slight odor, not unpleasant |
| Texture | Crunchy |

EFFECT OF PECTIN COMPOSITION ON PLASMA CHOLESTEROL IN RATS

Fifty-seven white Wistar rats (Female Charles Rivers, Wilmington, Mass.) were randomized into four groups and fed test diets for seven days. Total plasma cholesterol was determined for each rat the end of the test period.

Diet 1 group received rat chow control.

Diet 2 group received high fat, high cholesterol chow.

Diet 3 group received high fat, high cholesterol chow containing egg white/cellulose.

Diet 4 group received high fat, high cholesterol chow containing a protein-enriched pectin composition of this invention.

Respective diets contained the following ingredients as shown below.

| Ingredient | w/w % |
|---|---|
| Diet 1: Ground rat chow type 5012 (Purina Mills, Richmond, Indiana). | |
| Diet 2: | |
| Ground rat chow type 5012 | 90.7 |
| Cellulose* | 3.0 |
| Coconut oil* | 5.0 |
| Cholesterol* | 1.0 |
| Cholic acid* | 0.3 |
| TOTAL | 100.0 |
| Diet 3: | |
| Ground rat chow type 5012 | 84.6 |
| Egg white**/cellulose* | 9.1 |
| Coconut oil* | 5.0 |
| Cholesterol* | 1.0 |
| Cholic acid* | 0.3 |
| TOTAL | 100.0 |
| Diet 4: | |
| Ground rat chow type 5012 | 84.6 |
| Egg white-pectin product (prepared according to the method of Example 1) | 9.1 |
| Coconut oil* | 5.0 |
| Cholesterol* | 1.0 |
| Cholic acid* | 0.3 |
| TOTAL | 100.0 |

*Cellulose, coconut oil, cholesterol and cholic acid are all available from ICN Pharmaceuticals, Costa Mesa, California.
**Egg white is available from Bartow Food, Bartow, Florida.

TABLE 1

TOTAL PLASMA CHOLESTEROL (mg/dl)

| | DIET 1 N = 12 | DIET 2 N = 15 | DIET 3 N = 15 | DIET 4 N = 15 |
|---|---|---|---|---|
| | 60 | 127 | 163 | 130 |
| | 67 | 196 | 184 | 132 |
| | 90 | 230 | 136 | 140 |
| | 61 | 174 | 145 | 148 |
| | 63 | 176 | 142 | 123 |
| | 80 | 133 | 170 | 141 |
| | 61 | 127 | 167 | 147 |
| | 63 | 160 | 213 | 109 |
| | 58 | 228 | 153 | 108 |
| | 73 | 236 | 162 | 119 |
| | 76 | 147 | 136 | 101 |
| | 70 | 192 | 104 | 130 |
| | — | 232 | 147 | 132 |
| | — | 186 | 107 | 121 |
| | — | 127 | 160 | 101 |
| MEAN ± SD | 69 ± 9.3 | 178 ± 39.3 | 153 ± 26.6 | 125 ± 15.0 |

The plasma cholesterol lowering effect of the pectin product is apparent in TABLE 1. These data show that the pectin composition of the present invention significantly lowers a mean plasma cholesterol level in rats receiving the product as compared to rats receiving various control diets.

EFFECT OF PECTIN COMPOSITION ON PLASMA CHOLESTEROL IN GUINEA PIGS

Nineteen guinea pigs (Female Harlan Sprague Dawley, Indianapolis, Ind.) were used in this study and randomized into four diet groups and weekly plasma cholesterol concentrations determined.

Diet 1 group received control chow.

Diet 2 group received high fat, high cholesterol chow.

Diet 3 group received high fat, high cholesterol chow containing a protein-enriched pectin composition of this invention.

Diet 4 group received high fat, high cholesterol chow containing egg white/cellulose.

Respective diets contained the following ingredients as shown below.

| Ingredient | w/w % |
|---|---|
| Diet 1: Guinea pig chow 5025 (Purina Mills, Richmond, Indiana). | |
| Diet 2: | |
| Guinea pig chow 5025 | 91.0 |
| Cellulose* | 3.0 |
| Coconut oil* | 5.0 |
| Cholesterol* | 1.0 |
| TOTAL | 100.0 |
| Diet 3: | |
| Guinea pig chow 5025 | 84.9 |
| Egg white/pectin product (prepared according to the method of Example 1) | 9.1 |
| Coconut oil* | 5.0 |
| Cholesterol* | 1.0 |
| TOTAL | 100.0 |
| Diet 4: | |
| Guinea pig chow 5025 | 84.9 |
| Egg white/cellulose* | 9.1 |
| Coconut oil* | 5.0 |
| Cholesterol* | 1.0 |
| TOTAL | 100.0 |

*Cellulose, coconut oil, and cholesterol are all available from ICN Pharmaceuticals, Costa Mesa, California.
**Egg white is available from Bartow Foods, Bartow, Florida.

TABLE 2

TOTAL PLASMA CHOLESTEROL (mg/dl)

| WEEK | DIET 1 | DIET 2 | DIET 3 | DIET 4 |
|---|---|---|---|---|
| 1 | 49 | 298 | 186 | 270 |
| 2 | 49 | 442 | 158 | 411 |
| 3 | 43 | 460 | 173 | 545 |
| 4 | 51 | 485 | 230 | 599 |
| 5 | 46 | 448 | 188 | 550 |
| 6 | 51 | 490 | 210 | 526 |
| MEAN ± SD | 48 ± 3 | 437 ± 65 | 191 ± 24 | 483 ± 111 |

The plasma cholesterol lowering effect of the pectin product is apparent in TABLE 2. These data show that the pectin composition of the present invention significantly lowers the mean plasma cholesterol level in guinea pigs receiving the composition of the invention as compared to guinea pigs receiving various diets lacking the composition.

EXAMPLE 3

Orange juice, using the products of this invention, was prepared. The product of EXAMPLE 1 was dissolved in orange juice in a ratio of 5 g product/250 ml juice. The product readily dispersed in the juice and there was no change in the hedonic characteristics of the orange juice.

The products of Example 1 were also added to fruit bars, toffee bars, and cold cereal. The products were seasoned and used as croutons on tossed salad. Thus, these products were tested for product palatability and desirability. The consensus of opinion of those who tested was good to excellent.

The invention now being fully described, it will be apparent to one of ordinary skill in the art that various changes and modifications can be made without departing from the spirit or scope of the invention.

We claim:

1. A method for preparing a granular protein-enriched pectin composition comprising the steps of:
   (a) adding, to an aqueous solution, an edible protein and pectin to create a solution having about 0.5 to about 5 w/w % pectin and an equal or greater percentage of protein;
   (b) adding one or more solvents in an amount sufficient to cause co-precipitation of said pectin and protein such that said pectin is entrapped by said protein, wherein said solvent is selected from the group consisting of methanol, ethanol, and acetone;
   (c) allowing curd to form in the solution of step (b); and
   (d) filtering and drying the curd to provide said granular pectin composition comprising at least about 30 w/w % of pectin.

2. The method of claim 1, wherein the pectin is a high methoxyl pectin.

3. The method of claim 1, wherein the pectin is a citrus pectin.

4. The method of claim 3, wherein the citrus pectin is a grapefruit pectin.

5. The method of claim 1, wherein the edible protein is egg white.

6. The method of claim 1, wherein the edible protein in an aqueous solution is skimmed milk.

7. The method of claim 1, wherein the solvent added in step (b) is ethanol.

8. The method, according to claim 1, further comprising the step of acidifying the solution of step (a) with a food approved acid to a pH of between about 3.0 and about 5.0.

9. The method, according to claim 8, wherein the food approved acid is selected from the group consisting of acetic acid, citric acid, tartaric acid, and fumaric acid.

10. A protein-enriched pectin composition in granular form comprising from about 30 to about 35% on a weight basis, of pectin, the balance being protein.

11. The composition of claim 10, wherein the pectin is a citrus pectin.

12. The composition of claim 11, wherein the citrus pectin is a grapefruit pectin.

13. The composition of claim 10, wherein the pectin is a high methoxyl pectin.

14. The composition of claim 10, wherein the protein is selected from the group consisting of lactalbumin, casein and ovalbumin.

* * * * *